Figure 1:
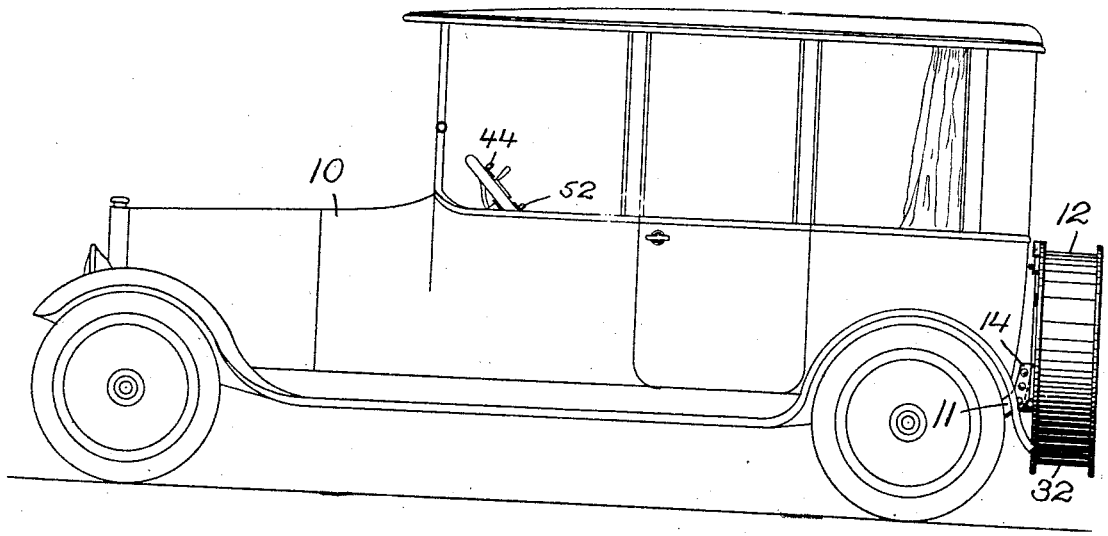

C. MERSFELDER.
REAR SIGNAL DEVICE FOR AUTOMOBILES.
APPLICATION FILED MAR. 8, 1917.

1,283,855.

Patented Nov. 5, 1918.
2 SHEETS—SHEET 1.

INVENTOR
Charles Mersfelder,
by
Wm H Canfield,
ATTORNEY

C. MERSFELDER.
REAR SIGNAL DEVICE FOR AUTOMOBILES.
APPLICATION FILED MAR. 8, 1917.

1,283,855.

Patented Nov. 5, 1918.
2 SHEETS—SHEET 2.

INVENTOR
BY Charles Mersfelder
Wm H Caufield
ATTORNEYS

UNITED STATES PATENT OFFICE.

CHARLES MERSFELDER, OF NEWARK, NEW JERSEY.

REAR SIGNAL DEVICE FOR AUTOMOBILES.

1,283,855. Specification of Letters Patent. Patented Nov. 5, 1918.

Application filed March 8, 1917. Serial No. 153,235.

*To all whom it may concern:*

Be it known that I, CHARLES MERSFELDER, a citizen of the United States, and a resident of Newark, county of Essex, and State of New Jersey, have invented certain new and useful Improvements in Rear Signal Devices for Automobiles of which the following is a specification.

This invention relates to an improved signal device for automobiles or for other locations in which it can be used, and is adapted for illumination so that selected lights can be lighted, or other identifying or indicating devices can be operated to indicate a change of speed or a change of direction contemplated by the driver of a vehicle.

Another object of the invention is to provide such a signal device which also embodies a tail-light which is adapted to be constantly illuminated when a tail-light is necessary, and it can be further used to illuminate a suitably disposed license plate.

The invention is still further designed to provide a device of this kind which is provided with a cover which forms a closure for the open face of the casing and is provided with suitably colored or otherwise prepared openings through which light from the casing is adapted to pass, the casing being preferably partitioned so that light in one of the chambers formed by the partitions illuminates only the opening in register with the chamber, the cover being removable to facilitate the cleaning or the installation or removal of bulbs, usually electric light bulbs, placed in the chambers.

The device is also adapted to be used as a support for elements, and in the drawing and in this description it is described as being utilized for holding a tire or tires, such supported elements being covered by the cover used on the light casing which is extended and preferably provided with a flange for this purpose. The cover can be still further utilized for supporting the license plate mentioned before, and which is adapted to be illuminated by one of the lights in the light casing.

The frame of the device is adapted to be secured to a vehicle, preferably at the rear thereof, the outer face being the face that is utilized for signaling purposes and is readily seen by the driver of a vehicle in rear, the device embodying a tail-light, indicating devices, tire-holder, and also a bracket for holding the license plate, thereby concentrating elements that are usually scattered and spread over the rear of a car, this concentration providing for a reduction of the parts subject to cleaning and also protecting these parts from the weather.

The invention is illustrated in the accompanying drawings which show one embodiment of my invention which, it will be understood, can be changed in minor details and in the arrangement of the parts to adapt it to different makes of machines and also for carrying or supporting different accessories or supplies for a vehicle.

Figure 2:
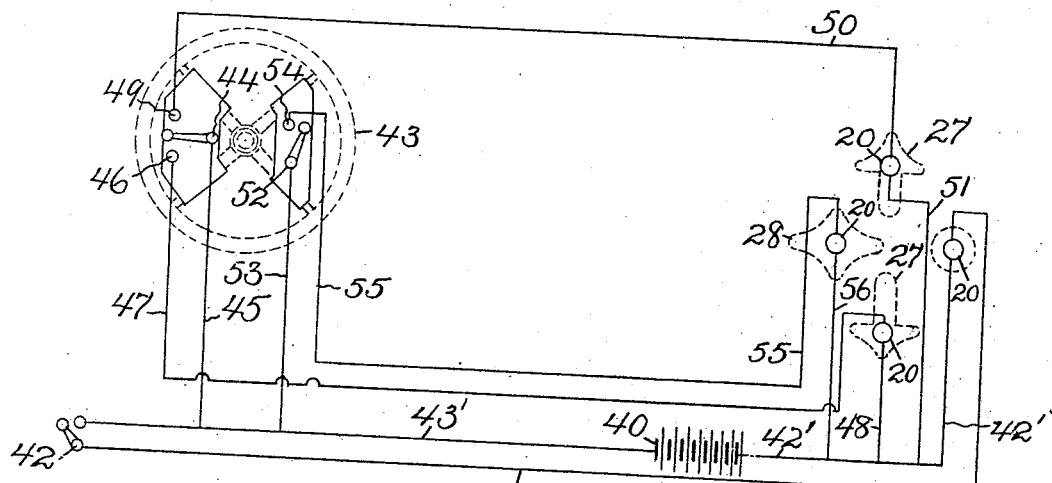
Figure 3:
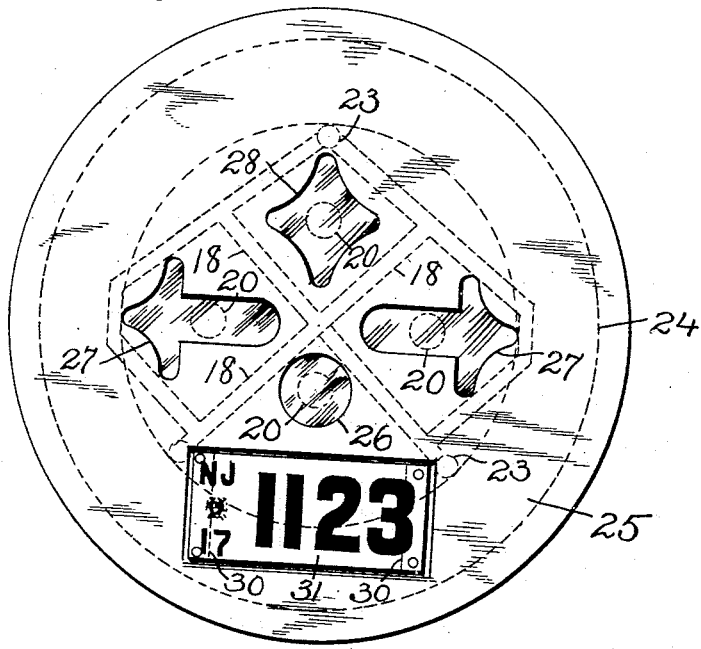
Figure 4:
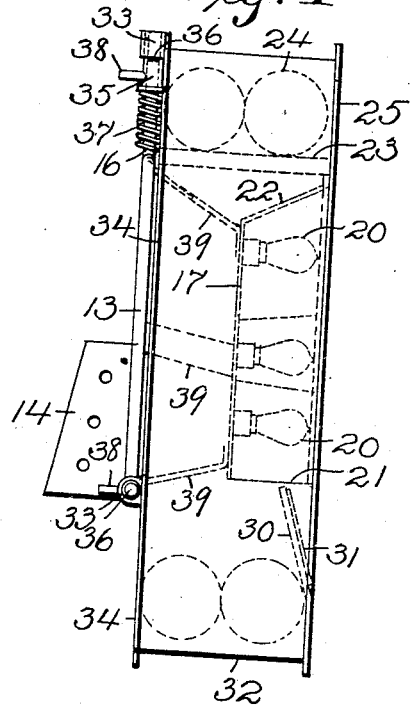
Figure 5:
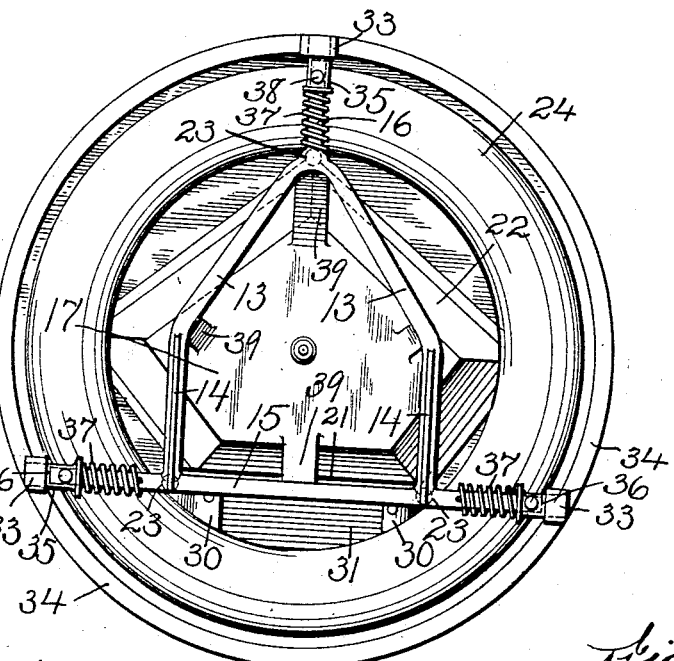
Figure 6:
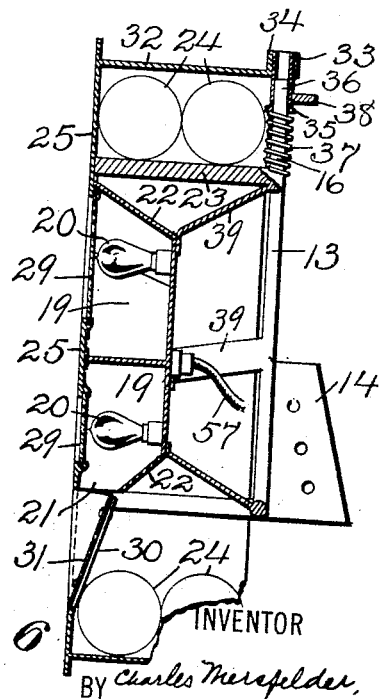

In the drawings, Figure 1 is a side view of an automobile provided with the improved signaling device and holder. Fig. 2 is a diagrammatic view showing the circuits that can be employed for operating the device. Fig. 3 is a face view of the improved holding and indicating device. Fig. 4 is a side view of the device shown in Fig. 3. Fig. 5 is a rear view of the device shown in Fig. 3, and Fig. 6 is a central vertical section taken through Fig. 5.

The device can be attached to vehicles on which it is adapted to be used, but it is preferably fastened to automobiles, the automobile 10 having a suitable fixture or means 11 projecting therefrom to which the device can be attached, although any form of attaching means can be employed, and the device can also be built directly on the car when the car is manufactured. The device, which in general is identified by the numeral 12, is arranged so that one face projects toward the rear and can be readily seen by the driver of a car following the one on which it is placed. A suitable frame acts to hold the mechanism, the frame shown comprising arms 13 which are provided with suitable fastening means, such as plates 14, by means of which the frame is attached to the supporting elements 11. The arms 13 may be secured together by a horizontal arm 15 and are preferably merged at the top to form a projecting arm 16, the ends of the arms 15 and 16 being preferably used for fastening a cover, to be hereinafter described, in place, although other means for fastening the cover can be used. The frame supports a light casing 17 which has an open face and is further provided with suitable partitions 18 which form chambers 19 into which suitable lights, such as the electric light bulbs 20, can be placed.

I prefer to provide one of the chambers 19 with an open side, and in the form shown the bottom side is the one that is open so that the lower chamber has an open side 21 through which the light can pass from the light in the lower chamber. The insides of the chambers are preferably made so that they are reflective, either by being painted white or by being suitably polished, and to further concentrate the light I prefer to make the sides of the casing tapered as at 22. Surrounding the light casing I arrange suitable supporting arms on which elements can be supported as desired, and different forms of supporting arms can be used according to what is to be supported on the frame, but for the purpose of clearly illustrating the invention and to show it in its preferred form I show arms 23, in the illustration these being three in number and being spaced so as to receive a tire or tires, two of such tires 24, 24 being shown in the drawing and being adapted to be fitted around the arms 23, as will be evident, the tires being flexible and resilient enough to be passed around the edges of the casing 17, in case such casing is made large enough to be slightly larger in certain directions than the inside diameter of the tires.

A cover 25 is arranged to close the open face of the casing 17 and is provided with openings to permit the passage of light from the chambers in the light casing, such openings being designed to be used for indicating the action of the driver of the vehicle and also for acting as a tail-light, in the form shown the opening 26 opposite the lower light chamber being provided with a red glass or other suitable coloring medium so that it acts as a tail-light, the opening being preferably made round. The side openings 27 can be formed so as to indicate right and left directions, and the top opening 28 can be any conventional symbol for indicating that the driver is going to stop the vehicle. These light openings are preferably provided with coverings that permit the passage of light and can be of any suitable color, such as the red glass plates 29 shown particularly in Fig. 6, and their illumination is such and they are large enough to be used in the daytime, although they are primarily adapted for use at night.

The cover is depressed to form the supporting plates or brackets 30, these being usually slightly inclined so that when a license plate 31 is fastened to said brackets or plates 30, the light from the bulb in the lower chamber of the light casing can pass out through the opening 21 and illuminate the license plate so that the bulb that illuminates the tail-light also illuminates the license number. The cover is further extended so as to extend beyond the arms 23 and the article supported on the frame and within the storage space or chamber provided exterior to the light casing by the extending portion of the cover, in the particular case illustrated these being the tires 24. The cover is further provided with a peripheral flange 32 which, in addition to forming a protective covering for the tires and for the casing, provides means for fastening the cover in place. In the form shown this fastening means is adapted to engage the inner end of the flange 32 and also the ends of the arms 15 and 16, the form illustrated comprising sockets 33 on the edge 34 of the flange 32, and sleeves 35 slide on the ends of the arms 15 and 16 and project beyond the ends 36 of these arms under the influence of the springs 37 so that the cover is securely held in place, is not apt to rattle, and is held against turning so that the identifying openings in the cover are held opposite the respective chambers in the light casing to which they apply. Handles 38 can be placed on the sleeves 35 to operate them against the influence of the springs 37, and, if desired, suitable locking means can be employed to prevent sliding of these sleeves 35 on the arms so as to guard against theft. The cover when in place supports a license plate, has identifying openings to coöperate with the lights in the light casing, protects the lights in the light casing, and also the articles held on the support, from the weather, and concentrates within one structure all the essential elements that are carried on the back of an automobile, thereby saving space and providing less articles to be kept clean. The light casing can be supported in any suitable way, but in the form shown I show bracing strips 39 which are fastened to the frame and also to the light casing, as will be understood.

In Fig. 2 I show a diagrammatic view of one manner of connecting the lights in the device with a suitable source of power and also with a regulating means. In the form shown the source of electricity is supplied by the battery 40, and the bulb 20 that is used for the tail-light is connected by a wire 41 to a suitable switch 42, and a return wire 43' passes from the switch to the battery and beyond the battery, as at 42', to the bulb 20. This light is put on a separate switch because it is more continuously lighted than the other and is preferably on a different circuit. It not only lights the tail-light but it illuminates the license plate. The switches for operating the other lights can be suitably disposed. In the drawing I show them mounted on the steering wheel 43, one switch 44 being connected by a wire 45 with the return wire 43', one of the terminals 46 of the switch 44 being connected by a wire 47 with the bulb behind the left hand indicating device 27, the bulb in this latter case being connected by a wire 48 with the return wire 43'. The other or right hand terminal 49 of the switch 44 is connected by a wire 50 with the bulb in the right hand indicating device 27, this bulb in turn being connected by a wire 51 with the return wire 43'. In this way the switch 44 can be thrown to the left to light up the left indicator and thrown to the right to light up the right indicator so as to show which way the vehicle is to turn.

A switch 52 is connected to the wire 43' by a wire 53, the other terminal 54 being connected by a wire 55 with the bulb behind the opening 28, this bulb being connected by a wire 56 with the return wire 43'. The operation of the switch 52 turns on or off the bulb in the stop indicator, and in this way the lights can be operated in a selective manner so as to at all times indicate the intention of the driver of the vehicle.

The circuit wires are preferably arranged in a cable so as to group them in one strand and can be conducted to the light casing by means of a suitable cable 57 shown particularly in Fig. 6, as will be evident.

The light casing 17, or the arms 23, or, if desired, all of them, can project far enough to engage the rear face of the cover 25 and thus brace the cover which is preferably made of sheet metal and is thus kept from bending or vibrating, and this contact of the parts lends stability to the whole structure.

Any suitable part of the device, preferably the arms 23, can be provided with any suitable means for rigidly clamping the tires to the arms and preventing their movement so as to prevent rattling or any wear of the tires incidental to such movement within the holder.

Having thus described my invention, I claim:

1. In a signal device, a light casing having a plurality of light chambers; means for supporting said casing; a cover for closing said casing and which cover is provided with a plurality of indicating openings associated one with each of said chambers, said cover extending beyond said light casing and having a peripheral flange whereby a storage space or chamber is provided exterior to said light casing.

2. In a signal device, a light casing having a plurality of light chambers; means for supporting said casing; a removable cover for closing said casing and which cover is provided with a plurality of indicating openings associated one with each of said chambers, said cover being larger than said light casing and having an annular peripheral flange whereby an annular storage space is provided exterior to said light casing.

3. In a signal device, a suitable frame; a light casing supported by said frame and having a plurality of light chambers; a removable cover for closing said casing and which cover is provided with a plurality of indicating openings associated one with each of said chambers, said cover extending beyond said casing and having a flange extending toward said frame whereby a storage space or chamber is provided exterior the said light casing; means carried by said frame for supporting articles within said storage space; and means carried by said frame and engaging said flange for detachably holding said cover in place.

4. In a signal device, a suitable frame, a light casing supported by said frame and having a plurality of chambers; a plurality of arms arranged above said light casing; a cover for closing said casing and which cover is provided with a plurality of indicating openings associated one with each of said chambers, said cover extending beyond the arms aforesaid and having an annular peripheral flange whereby an annular storage space or chamber is provided between said arms and said flange; and detachable fastening means carried by said frame and engaging said flange for holding said cover in place.

5. In a signal device, a partitioned casing, lights in the casing, a cover having indicating openings therein, means for holding the cover on the casing so that the openings are adapted to be lighted by lights in the casing, and an obliquely arranged license plate holder on said cover disposed so that the face of the license is adapted to be illuminated by one of the lights.

6. A signal device comprising a frame having tire-supporting arms projecting therefrom, a casing having an open face and adapted to contain lights, and a cover having openings therein for the passage of light from said casing, the cover having a flange to surround the tires supported on said arms, the cover having a depressed plate support, the casing being open at one side to permit the passage of light to said depressed part.

7. A signal device comprising a frame, arms on the frame supporting a tire, a casing supported within the arms and having an open face, partitions in the casing, lights in said casing, the cover being adapted to be detachably secured to the frame and having a flange for inclosing a tire supported on the arms, the cover having openings therein to permit the passage of light from the casing, and means for causing a selective lighting of the lights in the casing.

8. A signal device comprising tire-supporting arms and a light-inclosing casing with an open face, and a cover common to said casing and said arms, said cover having openings to permit the passage of light from the casing.

9. A signal device comprising a casing having partitions therein to form light chambers, lights in said chambers, one of said chambers having an open side, a cover for said casing having a depressed part to support a license plate and adapted to receive light through the open side on said plate, the cover having an opening in register with the chamber with the open side, said opening permitting the passage of light and being provided with suitably colored elements so as to form a tail-light, suitably formed openings in the cover opposite the other chambers of the casing to indicate the action of the driver of a vehicle, and means for a selective operation of the lights for illuminating said last mentioned openings.

In testimony that I claim the foregoing, I hereto set my hand, this 6th day of March, 1917.

CHARLES MERSFELDER.